May 4, 1937. R. C. ZUCKERMAN 2,079,061
METHOD OF MIXING AND DISTRIBUTING FERTILIZERS
Filed Sept. 26, 1934 2 Sheets-Sheet 1

INVENTOR
R. C. Zuckerman
BY
ATTORNEY

May 4, 1937.  R. C. ZUCKERMAN  2,079,061
METHOD OF MIXING AND DISTRIBUTING FERTILIZERS
Filed Sept. 26, 1934   2 Sheets-Sheet 2

INVENTOR
R.C. Zuckerman
BY
ATTORNEY

Patented May 4, 1937

2,079,061

UNITED STATES PATENT OFFICE 2,079,061

METHOD OF MIXING AND DISTRIBUTING FERTILIZERS

Roscoe C. Zuckerman, Stockton, Calif.

Application September 26, 1934, Serial No. 745,568

4 Claims. (Cl. 275—1)

This invention relates to the planting art, and particularly to a method for mixing and distributing fertilizer in the drills, furrows or other places prepared for the planting of seed. It is particularly adapted for use in connection with those types of combination fertilizers and seeders as shown in my Patent No. 1,893,512 and Patent No. 2,036,559, although undoubtedly it will also be found readily adaptable for use in other ways.

The chief objective of the invention is to provide a method and means whereby the different elements going to make up fertilizers of different kinds may be kept in segregated relation until immediately prior to use and then mixed in desired proportions and at once distributed upon the soil.

Commercial fertilizers as now generally purchased and applied by farmers to their crops are usually composed of two or more elements as, for instance, nitrogen, phosphate and potash. The ultimate consumer buys the fertilizer, comprising these several elements, from the dealer, who usually has a manufacturing plant, and they are premixed in such plant. In premixing the elements in such plant the dealer first mixes the several elements in the correct proportions according to the selected formula and the mixture is then stored. The several elements as thus mixed cement together in storage and harden. After being in storage a proper length of time the cemented mass is reground and sacked. The price to the final consumer must obviously include the cost of this storage and regrinding operation. The cost of chemical fertilizers is in any event quite heavy and this additional expense increases the burden considerably.

In order to avoid this additional burden of expense I have conceived of the present disclosed method of maintaining the several elements separate until just before use. I then provide a means for transporting separate supplies of each element along and adjacent the ground to be fertilized, and while transporting the same withdrawing material from the supplies in the desired relative proportions, mixing them and then at once discharging the mixture onto the soil. Thus the premixing costs will be avoided and still the several fertilizer elements will reach the soil in the properly mixed proportions.

These objects I accomplish by means of such structure and relative arrangement of parts as will fully appear by a perusal of the following specification and claims.

In the drawings similar characters of reference indicate corresponding parts in the several views:

Fig. 5 is an end view of the staggered pin mixing element.

Figure 1:
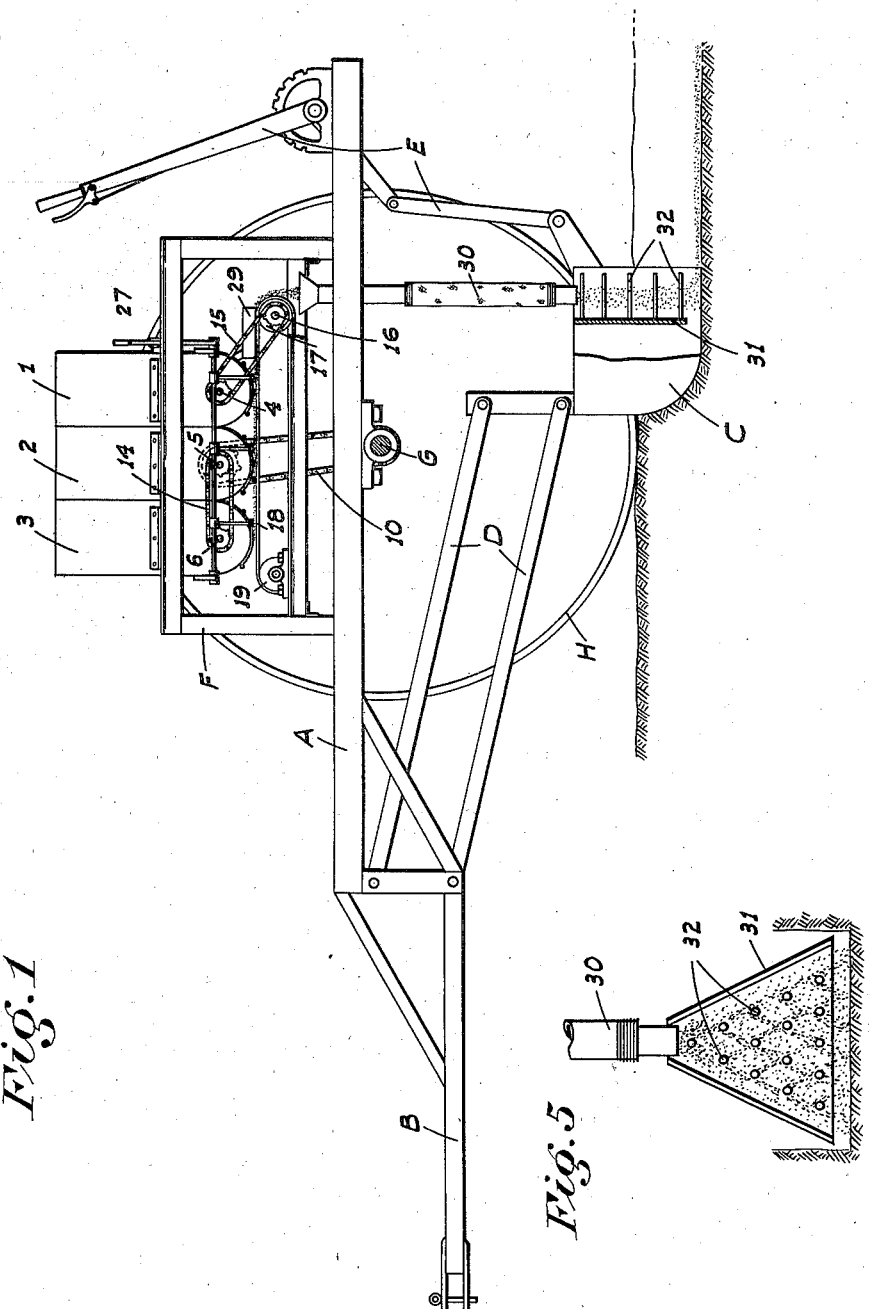
Fig. 1 is a side elevation of one preferred form of apparatus by which my improved method may be carried out.

Referring now more particularly to the characters of reference on the drawings A designates generally a wheeled vehicle having a connecting tongue B by which it may be connected to a suitable source of draft powers, such as a tractor, horses, or the like.

If found desirable this vehicle may be provided with a suitable furrow forming element C supported from the main frame of the vehicle by links D and rendered adjustable by lever and link connections E, all substantially as shown and for the purpose described in my above identified patent and application for patent. For the purpose of carrying out my improved method a suitable superstructure F carried by this vehicle A may be mounted thereon; the separate material hoppers and mixing and distributing mechanism which I will now proceed to describe in detail being mounted on said superstructure.

The numerals 1, 2, and 3 indicate separate supply hoppers in each of which may be disposed a supply of each of the different elements going to make up the final mixed fertilizer to be distributed upon the soil. In these hoppers are disposed shafts 4, 5, and 6 respectively, and on which shafts are mounted agitating elements 7, 8, and 9 respectively. The shaft 5 is driven from the axle G of the wheels H of the vehicle by means of a chain 10 driving a sprocket wheel 11 mounted on the outer end of the shaft 5. A spur gear 12 meshes with a similar spur gear 13 on the shaft 4. A chain drive 14 connects the opposite end of the shaft 5 with the shaft 6. Thus with the rotation of the shaft 5 the shafts 4 and 6 are also rotated.

A chain drive 15 drives off from the shaft 4 and drives a shaft 16. This shaft 16 in turn drives a conveyor roller 17 driving a conveyor belt 18 which passes around another roller 19 at its opposite end. The upper run of the belt 18 moves immediately under the lower ends of the hoppers 1, 2, and 3.

Figure 2:
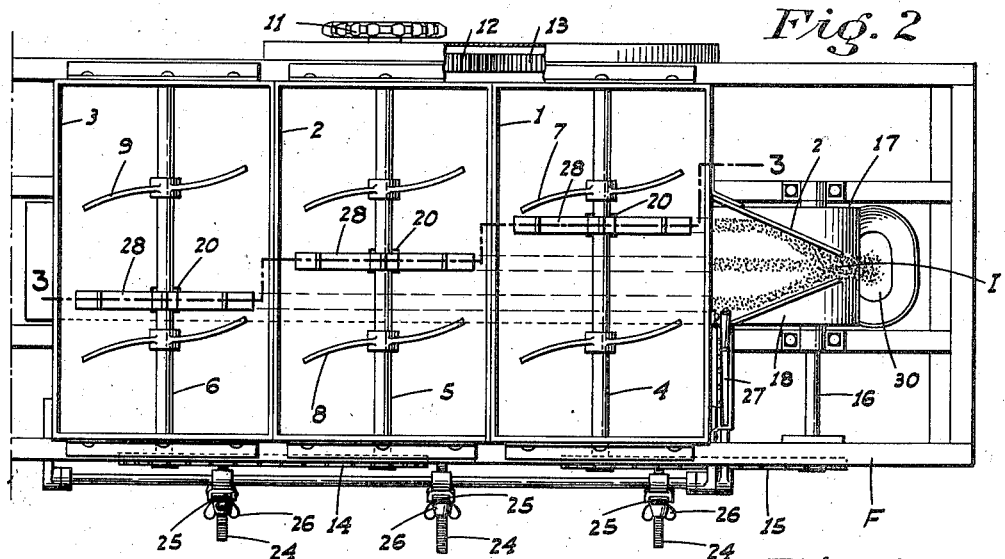
Fig. 2 is a top plan view of the same.
Figure 3:
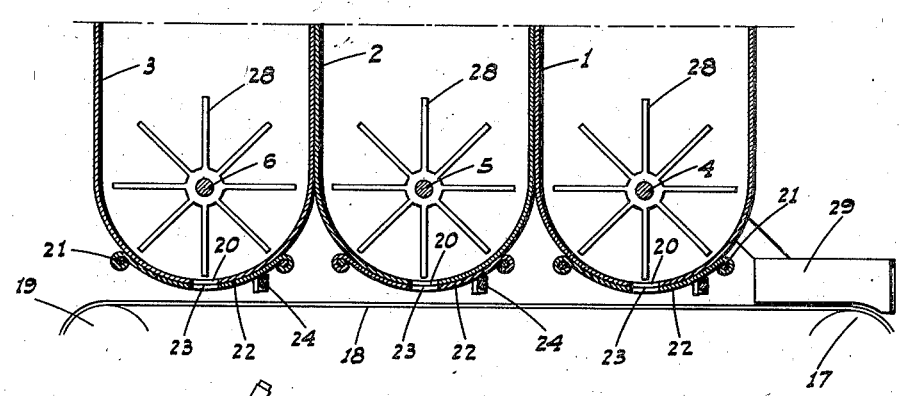
Fig. 3 is a sectional view taken on a line 3—3 of Fig. 2.
Figure 4:
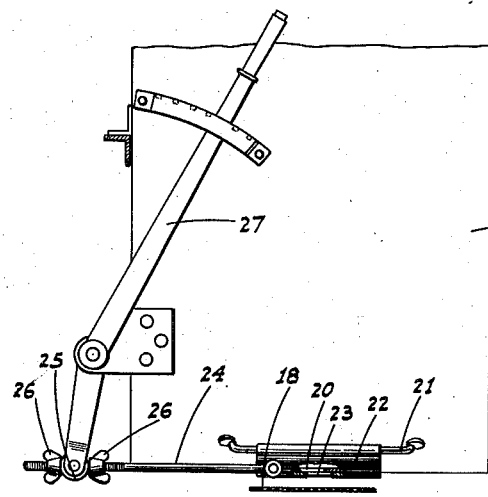
Fig. 4 is a detached end view of one of the supply hoppers and valve, and valve operating means.

Each hopper is provided with a bottom adjustable and controlled valve structure arranged to discharge the contents of the hoppers upon the belt 18, these valves being arranged in staggered relation with each other so as to discharge the contents of the hoppers in separated streams upon the belt, as shown more clearly in Figs. 2 and 3.

Each valve construction is identical, and I will therefore describe one of them, the others being duplicates thereof. The valve construction involves an opening 20 in the bottom of the hopper. On each side of this opening is a rod 21. Slidable over the rods 21 is a shutter 22 having a hole 23 adapted to be moved into or out of register with the hole 20 in the hopper in order to open communication from the hopper to the belt 18. On the shutter 22 is a rod 24 through the operation of which the shutter 22 may be moved along the rods 21 to bring the holes 20 and 23 into or out of register with each other. The rod 24 passes through a lever rod 25 set at right angles thereto and is provided with adjustment wing nuts 26 by means of which the exact position of the rod 24 may be set so that with the movement of the lever rod 25 the degree of opening from the hopper through the holes 20 and 23 may be fixed according to the amount of material desired to be discharged from the hopper. It will be obvious therefore that by the adjustment of the valve on each hopper to set the relative proportionate opening of each the amount of material discharged from each hopper may be so proportioned relative to that discharged from the other hoppers as to give any desired mixture of the fertilizer elements desired. As an instance of this if the farmer desires to discharge 1000 pounds of fertilizer per acre in what is known as a 4–10–10 mixture the adjustments on the several rods 24 are so fixed by the wing nuts 26 that the valves will open to discharge the elements in exactly that desired quantity and proportions. A lever 27 fixed on the lever rod 25 is operable to move all the rods 24 at one time and open or close the shutter valves accordingly. On the shafts 4, 5, and 6 within the hoppers 1, 2, and 3 are paddle wheels 28 set to rotate immediately adjacent the corresponding valves in the hoppers so as to definitely move the fertilizer elements through the valves, the agitators 7, 8, and 9 of course keeping the same loose and moving it toward the openings.

It will of course be apparent that with the valves adjusted to proportion the amount of material outleted from the hoppers separated streams of the material with the different elements in exactly the desired proportions will discharge upon the conveyor belt 18. This belt moves continuously in one direction and will carry these streams to a common point, as for instance converging baffle plates 29 projecting over the belt 18. These baffle plates will draw the several streams of fertilizer elements to a common point I as shown clearly in Fig. 2. At this point the several elements will therefore be initially mixed as they discharge over the end of the belt 18 and down the vertical discharge tube 30. The lower end of this tube 30 discharges into the upper end of the vertical distributing chute 31, which has diverging sides in order to distribute the fertilizer over the desired width.

The chute 31 is provided with a plurality of transversely disposed deflector bars or pins 32 set in staggered relation from the narrow upper end of the chute to the wider lower end. As the fertilizer drops by gravity down the discharge tube 30 into the chute 31 it flows over these bars or pins 32 bounding from one to the other, and hence the mixing of the several elements making up the finished fertilizer is enhanced so that the final product reaching the soil is thoroughly mixed.

This fertilizer mixer and distributor may be used alone or in conjunction with connected planters or seeders, as shown in my patent and application for patent aforesaid.

It will be quite obvious from the foregoing description that the several elements going to make up the final mixed fertilizer can by my new method and apparatus be carried along over and adjacent the soil and mixed as it is being carried and then immediately discharged upon the soil in its thoroughly mixed condition. It will also be apparent that the quantity discharged and the relative proportions of each kind of fertilizing element can be positively controlled so that whatever formula and quantity of fertilizer is desired to be distributed can be definitely fixed.

It will further be obvious that the use of my improved method and apparatus will eliminate the item of cost involved in the premixing, storage and grinding charges, thus materially reducing the cost of the fertilizer to the ultimate consumer.

While I have here illustrated one simple form of apparatus by which my improved and important method may be carried out it is of course to be understood that I do not intend to be limited to the use of that particular apparatus in carrying out the method, but may use such other suitable apparatus as may be found useful for the purpose.

Having thus described my invention, what I claim as new and useful and desire to secure by Letters Patent is:

1. The method of mixing fertilizer ingredients to form a fertilizer mixture and distributing such fertilizer upon the soil comprising establishing separate amounts of the different ingredients in the proportions necessary to form a balanced fertilizer mixture, moving such amounts along and adjacent the soil, mixing such amounts together as they are so moved, to form the desired fertilzer mixture, and then immediately discharging the mixture upon the soil.

2. The method of mixing fertilizer ingredients to form a fertilizer mixture and distributing such fertilizer upon the soil comprising moving a supply of each ingredient along and adjacent the soil, separately discharging measured amounts of the ingredients from their respective supplies in predetermined proportions to each other, moving the several amounts so discharged to a common point, thoroughly mixing such amounts together to form the desired fertilizer mixture, and immediately discharging such mixture upon the soil.

3. The method of mixing fertilizer ingredients to form a fertilizer mixture and distributing such fertilizer upon the soil comprising moving a supply of each ingredient along and adjacent the soil, separately discharging measured amounts of the ingredients from their respective supplies in predetermined proportions to each other, mixing such amounts together to form the desired fertilizer mixture, and immediately discharging such mixture upon the soil.

4. The method of mixing fertilizer ingredients to form a fertilizer mixture and distributing such fertilizer upon the soil comprising moving a supply of each ingredient along and adjacent the soil, separately discharging measured amounts of the ingredients from their respective supplies in predetermined proportions so that all such amounts together provide a balanced fertilizer mixture, mixing such amounts together to form such mixture, and then immediately discharging the mixture upon the soil.

ROSCOE C. ZUCKERMAN.